C. H. SMOOT.
MAGNETIC SHIELDS FOR ELECTRIC MACHINES.
APPLICATION FILED FEB. 16, 1907. RENEWED NOV. 23, 1910.
997,337.
Patented July 11, 1911.
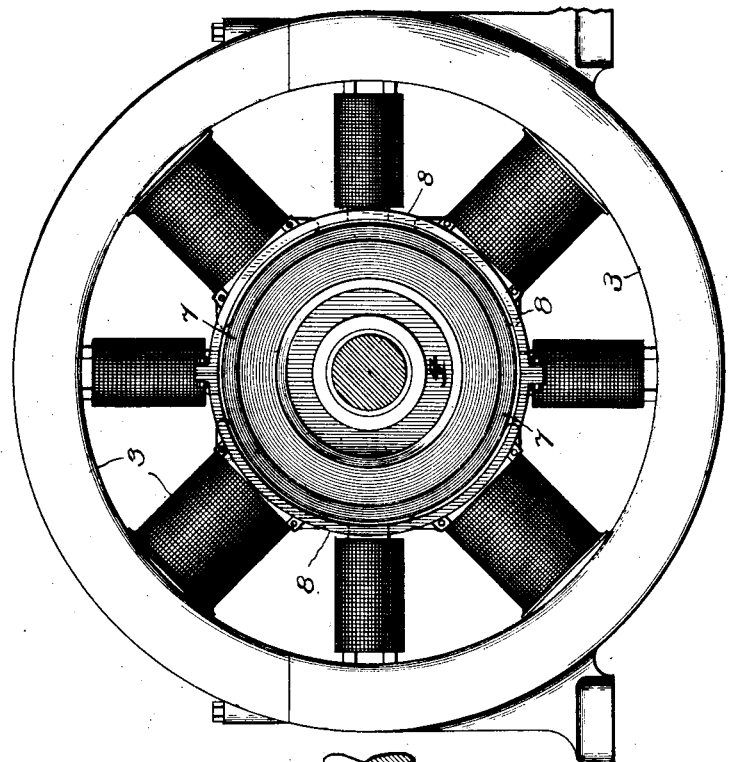
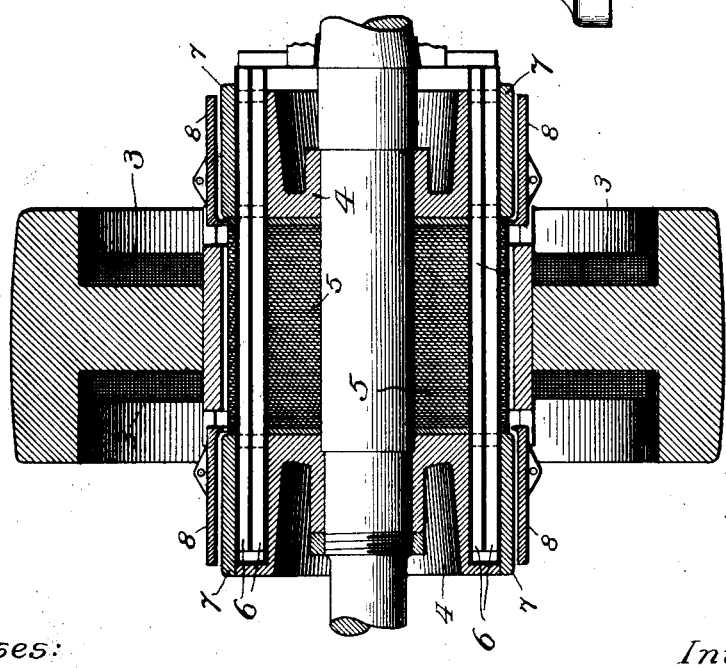
Witnesses:
Inventor:
Charles H. Smoot
By Barton, Tanner & Folk,
Attys.

UNITED STATES PATENT OFFICE.

CHARLES H. SMOOT, OF CHICAGO, ILLINOIS, ASSIGNOR TO RATEAU TURBINE COMPANY, OF CHICAGO, ILLINOIS, A CORPORATION OF WEST VIRGINIA.

MAGNETIC SHIELDS FOR ELECTRIC MACHINES.

997,337. Specification of Letters Patent. Patented July 11, 1911.

Application filed February 16, 1907, Serial No. 357,663. Renewed November 23, 1910. Serial No. 593,957.

*To all whom it may concern:*

Be it known that I, CHARLES H. SMOOT, citizen of the United States, residing at Chicago, in the county of Cook and State of Illinois, have invented a certain new and useful Improvement in Magnetic Shields for Electric Machines, of which the following is a full, clear, concise, and exact description.

My invention relates to electrical machines, such as generators and motors, whether of the direct-current or alternating-current type, and will be especially useful in its application to machines which are intended to be run at high speed, as by direct-connection to steam turbines. It is desirable to provide the rotors of such machines with metal retaining bands around the end portions, to confine and sustain the end-connections of the winding against centrifugal force; but it has been found that the stray magnetic flux leaking sidewise from the magnet poles toward the ends of the armature, and passing through the metal retaining bands on the rotor, set up eddy currents therein, which give rise to considerable heating and loss of energy.

In accordance with my invention, stationary cylindrical shields of magnetic material are provided, which surround the end portions of the rotor at a little distance therefrom, covering or partially covering the metal retaining bands of the rotor and acting to shield said bands from the stray or leakage field.

In the accompanying drawings, Figure 1 is a cross-sectional elevation of a direct-current turbo-generator equipped with the magnetic shields of my invention; and Fig. 2 is an end view thereof.

The same reference characters designate the same parts in both views.

The generator shown has a four-pole field magnet 3 (said magnet having commutating poles located intermediate the main poles) and an armature 4 arranged to rotate within the field of said magnet. The armature consists of a laminated iron core 5 and a winding composed of conductors 6 embedded in slots in the periphery of the core. These conductors necessarily extend some little distance beyond the ends of the laminated core, to provide for end-connections and commutator-leads; and metal retaining bands 7 are provided around the ends of the armature to confine and sustain such end-connections against centrifugal force. In accordance with this invention, cylindrical iron shields 8 are mounted so as to closely surround the end portions of the rotor and cover or partially cover the metal retaining bands on the latter. These shields are stationarily mounted, concentric with the rotor, as shown, and act to absorb any stray magnetic flux from the field poles that might otherwise tend to escape into the retaining bands and set up eddy currents therein. Any such leakage flux will, in my construction, enter the iron cylindrical shields and be absorbed thereby, but will not produce eddy currents therein because the shields are stationary. They need not, therefore, be laminated, but may be ordinary castings. The edges of the cylindrical shields nearest the magnet poles are preferably provided with flanges or rims 9 projecting radially inward, which overhang beyond the inner edges of the retaining bands of the rotor between said bands and the magnet poles and afford increased protection for said retaining bands against the stray or leakage field emanating from the lateral edges of the magnet poles. By means of this invention, therefore, it is possible to provide solid metal retaining bands of the requisite strength upon the rotor without consequent troubles from leaking and loss of energy in eddy-currents.

The shield rings 8 are preferably mounted upon non-magnetic spacing blocks secured to the pole pieces and interposed between said pole pieces and said shield, so as to prevent any needless portion of the magnetic flux from being diverted from the main circuit traversing the armature core. The intention is merely to provide a path of good magnetic conductivity in shunt of the end-portions of the armature, to carry such flux as would otherwise leak from the main circuit through the ends of the armature.

I claim:

1. In an electrical machine, the combination with a rotor provided with steel retaining bands, of stationary iron shields surrounding the end portions of the rotor concentric therewith and acting to absorb the leakage field.

2. In an electrical machine, the combination with a field magnet and its armature, one of said elements being movable, of steel retaining bands surrounding the end portions of the movable element and stationary iron shields surrounding said bands.

3. In an electrical machine, the combination with a field magnet, of an armature having end portions projecting beyond the sides of the field magnet poles, steel retaining bands upon said end portions, and stationary cylindrical iron shields surrounding said bands.

4. In a dynamo electrical machine, the combination with a field magnet system and a revolving armature provided with steel retaining bands at the ends of said armature, of stationary magnetic shields interposed in the normal path of the leakage field from said field magnets to the ends of said armature.

5. In a dynamo electrical machine, a field magnet system, an armature having retaining bands of magnetic material at its ends, and magnetic shields fixed to said field system and surrounding each end of the armature, whereby the leakage flux is diverted from said retaining bands.

6. In an electrical machine, the combination with a stationary field-magnet, of an armature mounted to rotate in the field of said magnet, said armature having a winding with end connections projecting beyond the sides of the field magnet poles, solid metal retaining bands embracing said end connections to hold the same against centrifugal force, and stationary iron shields at each end of the armature surrounding said retaining bands and acting to protect the latter from magnetism leaking from the field.

7. In a dynamo electric machine, an armature, retaining rings on said armature, pole-pieces exciting said armature and magnetic shields fixed upon said pole-pieces between said retaining rings and the pole pieces.

8. The combination with a field magnet for dynamos, of magnetic shield rings mounted at each side thereof.

9. In a dynamo machine, magnetic pole-pieces, magnetic shield rings fixed to said pole pieces upon either side thereof and non-magnetic spacing blocks between said pole pieces and said shield rings.

In witness whereof, I hereunto subscribe my name this 13th day of February A. D., 1907.

CHARLES H. SMOOT.

Witnesses:
 WM. C. ARNOLD,
 HENRY H. WAIT.

---

Copies of this patent may be obtained for five cents each, by addressing the "Commissioner of Patents, Washington, D. C."